(12) United States Patent
Tico et al.

(10) Patent No.: US 9,320,095 B2
(45) Date of Patent: Apr. 19, 2016

(54) CONTROLLER SYSTEM, INTEGRATED CIRCUIT AND METHOD THEREFOR

(75) Inventors: Olivier Tico, Saint Lys (FR); Laurent Bordes, Toulouse (FR); David Schlueter, Lake Villa, IL (US); Carl Wojewoda, Lake Zurich, IL (US)

(73) Assignee: FREESCALE SEMICONDUCTOR INC., Austin, TX (US)

( * ) Notice: Subject to any disclaimer, the term of this patent is extended or adjusted under 35 U.S.C. 154(b) by 1071 days.

(21) Appl. No.: 13/388,468

(22) PCT Filed: Aug. 18, 2009

(86) PCT No.: PCT/IB2009/054056
§ 371 (c)(1),
(2), (4) Date: Feb. 2, 2012

(87) PCT Pub. No.: WO2011/021075
PCT Pub. Date: Feb. 24, 2011

(65) Prior Publication Data
US 2012/0133292 A1    May 31, 2012

(51) Int. Cl.
*H05B 37/00* (2006.01)
*H05B 33/08* (2006.01)

(52) U.S. Cl.
CPC ........ *H05B 33/0818* (2013.01); *H05B 33/0842* (2013.01); *Y02B 20/347* (2013.01)

(58) Field of Classification Search
CPC ... G09G 2320/00–2320/106; G09G 3/00–3/38
See application file for complete search history.

(56) References Cited

U.S. PATENT DOCUMENTS 7,391,406 B2 * 6/2008 Yamamoto ......... H05B 33/0815
                                                        345/102
7,439,679 B2  10/2008 Grivas et al.
(Continued)

FOREIGN PATENT DOCUMENTS

EP      1750486 A1    2/2007
JP   2008182308 A  *  8/2008
(Continued)

OTHER PUBLICATIONS

Semtech: "SC4538 High Efficiency Boost Converter for up to 10 LEDs" 2008 Semtech Corporation, Web page: www.semtech.com, Jun. 20, 2008, pp. 1-14.
International Search Report and Written Opinion correlating to PCT/IB2009/054056 dated Sep. 24, 2010.

*Primary Examiner* — Sibin Chen

(57) ABSTRACT

A controller system controls a plurality of lighting element arrays. The controller system comprises array selection module for selecting a lighting element array, voltage control module arranged to apply a voltage to at least the selected lighting element array, a common current source arranged to provide a current from the common current source to the selected lighting element array, and duty cycle control module arranged to control a ratio of the current to the selected lighting element array over a time sharing cycle. The duty cycle control module is arranged to cause the array selection module to sequentially select the lighting element arrays in accordance with a time-sharing cycle, to cause the current from the common current source to be provided to the selected lighting element array in accordance with a respective duty cycle setting, and to cause the current provided to the selected lighting element array to be compensated for a rise time of the voltage applied thereto in order to be accurate with respect to the programmed settings.

20 Claims, 5 Drawing Sheets

(56) References Cited

U.S. PATENT DOCUMENTS

2007/0145914 A1 6/2007 Hong et al.
2009/0079363 A1* 3/2009 Ghoman et al. ............ 315/294

FOREIGN PATENT DOCUMENTS

WO 2008/041152 A2 4/2008
WO 2008/132562 A1 11/2008

* cited by examiner

CONTROLLER SYSTEM, INTEGRATED CIRCUIT AND METHOD THEREFOR

FIELD OF THE INVENTION

The field of this invention relates to a controller system for controlling a plurality of lighting element arrays and method therefor, and in particular to a controller system for controlling a plurality of lighting element arrays in a battery powered device.

BACKGROUND OF THE INVENTION

In the field of battery powered electronic devices, such as mobile telephone handsets, it is known for such devices to comprise multiple lighting components in conjunction with, for example, visual displays, keypads, etc. In the case of a mobile telephone handset, for example, the handset may comprise both a main display backlighting component and a keypad backlighting component. Furthermore, in the case of a 'clam shell' type telephone handset, where the main display is typically located within an inner surface of a hinged cover, and as such generally hidden from view when the handset is in a closed configuration, an auxiliary display of smaller size for displaying reduced information is often provided within an outer surface of the hinged cover such that the auxiliary display is visible when the handset is in the closed configuration. Accordingly, the clam shell telephone handset may further comprise an auxiliary display backlighting component.

Typically, the backlighting components are required to be activated independently, with each backlighting component comprising one or more lighting elements, such as light emitting diodes (LEDs), which may be connected in an array. The backlighting components for devices such as mobile telephone handsets are subject to various performance requirements. For example; uniformity of lighting is often required, both between the different backlighting components, as well as between the lighting elements of the same backlighting component. This is especially the case within the main display, which requires all the lighting elements in the same array to be supplied with well matched currents. In addition, low power consumption is desired in order to increase the battery life of the device. Independent luminosity control for the different lighting arrays is often a desirable feature, which requires independent programming of the LEDs' current sources for the different lighting arrays. Furthermore, independent dimming functionality for the different lighting arrays is sometimes used in backlighting components. However, these techniques require the provisioning of accurate current linearity for the programming of the LEDs' current sources.

Known backlighting controller systems that attempt to address some or all of the above performance requirements tend to require large semiconductor die area, in particular where a parallel driver is used with an individual current source for driving lighting elements within a backlighting component being connected in parallel. In addition, some backlighting controller systems require a high pin count of the integrated circuit that comprises the controller system, in particular if individual current sources are provided for each lighting element in a backlighting component. In some controller systems the use of separate voltage control modules for different lighting arrangements is excluded due to their requiring multiplication of costly self-inductances, which limits the possible usage cases for the lighting controller system, especially if more than one lighting component cannot be active simultaneously or if the luminosity of different lighting element arrays is too different.

A yet further problem associated with existing lighting controller systems occurs when several LED arrays with a different number of LEDs between the respective arrays have to be active simultaneously. The provision of current to the LED arrays in this situation, using the known techniques, results in undesirable power losses.

SUMMARY OF THE INVENTION

The present invention provides a system controller, an integrated circuit, a battery-powered device comprising such a system controller, and a method therefor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION

The invention will now be described, by way of example, as applied to a battery-powered device, such as a mobile telephone handset. However, it will be appreciated that the invention is equally applicable to other electronic devices, and in particular is applicable to alternative battery powered and/or handheld electronic devices, such as, by way of example only, personal digital assistants (PDAs), audio and/or multi-media players, navigation devices, portable television receivers, etc. Furthermore, because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Figure 1:
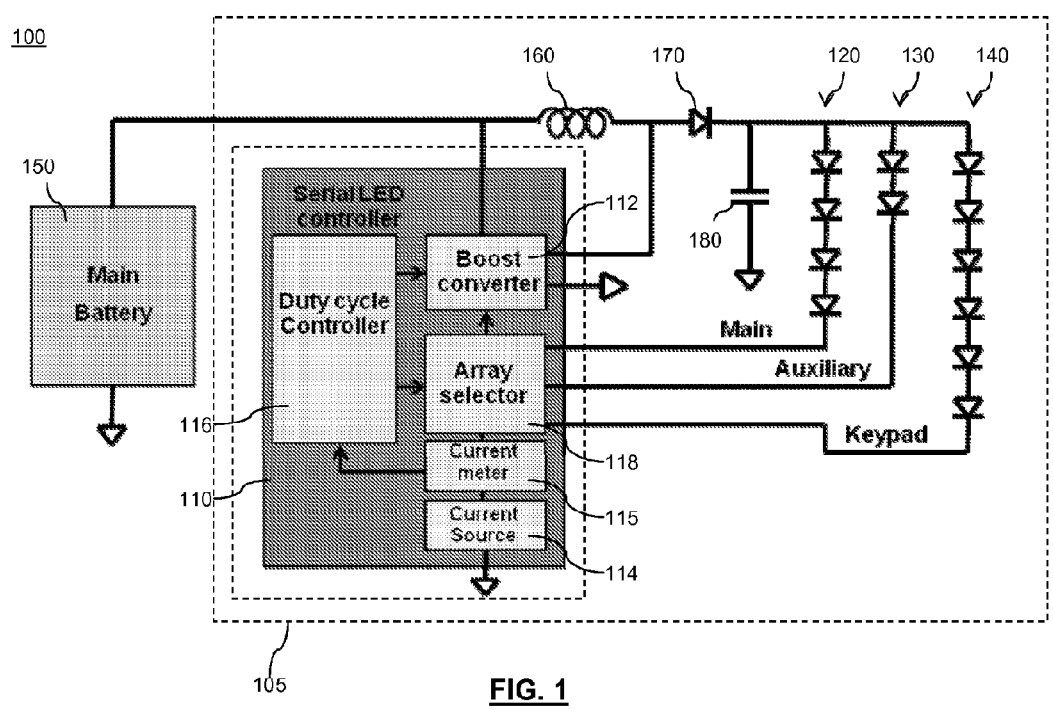
FIG. 1 illustrates an example of a controller system for controlling a plurality of lighting element arrays.

Referring now to FIG. 1, there is illustrated an example of a controller system 110 for controlling a plurality of lighting element arrays 120, 130, 140, which for the illustrated example forms part of an integrated circuit 105. For the illustrated example, the controller system 110 and lighting element arrays 120, 130, 140 form a part of a battery powered electronic device such as a mobile telephone handset 100, and more particularly for the illustrated example to a 'clam shell' type telephone handset. Accordingly, the telephone handset 100 comprises a first lighting element array 120 for providing backlighting to a main display of the telephone handset 100; a second lighting element array 130 for providing backlighting to an auxiliary display of the telephone handset 100; and a third lighting element array 140 for providing backlighting to a keypad of the telephone handset 100. For alternative examples, lighting element arrays may be provided for alternative components of the device that require illumination, such as backlighting. For the illustrated example, each of the lighting element arrays 120, 130, 140 comprises a plurality of lighting elements in the form of light emitting diodes (LEDs) connected in series. In this manner, all lighting elements of the same array receive substantially the same amount of current, and thus the luminosities of all the lighting elements within the same array are well matched. For alternative examples, a lighting array may comprise any suitable number of one or more lighting elements, as required.

The mobile telephone handset 100 further comprises a power supply, which for the illustrated example is in the form of battery 150, operably coupled to each of the lighting element arrays 120, 130, 140 via an inductor 160 and a diode 170. A capacitor 180 is operably coupled between a connection between the diode 170 and the LED arrays 120, 130, 140, and ground. A voltage control module 112 of the controller system 110 is operably coupled between the inductor 160 and diode 170, as described in greater detail below. The polarity of the diode 170 is such that current is substantially prevented from flowing back from the capacitor 180 through the inductor 160 and voltage control module 112.

The controller system 110 further comprises an array selection module 118 for selecting a lighting element array from the lighting arrays 120, 130, 140. For the illustrated example, the voltage control module 112 of the controller system 120 comprises a boost converter, and is arranged to control the voltage applied to the lighting arrays 120, 130, 140 so as to apply a desired voltage on top of lighting arrays. For the illustrated example, the array selection module 118 feeds back to the voltage control module 112 the voltage appearing at the connection between the selected lighting array 120, 130, 140 (i.e. the lighting array 120, 130, 140 to which the current source 114 is connected) and the array selection module 118. In this manner, the voltage control module 112 is able to control the voltage applied to the selected lighting array in order to maintain the voltage appearing at the connection between the selected lighting array 120, 130, 140 and the array selection module 118 at a desired value. The controller system 110 further comprises a common current source 114 arranged to provide a current to the selected lighting element array. The use of the common current source 114 facilitates good matching of the luminosities between the respective lighting arrays 120, 130, 140, the current source 114 thereby providing a substantially accurate current for each lighting array 120, 130, 140 as long as the voltage provided at the connection between the selected lighting array 120, 130, 140 and the array selection module 118 is above a threshold value.

The controller system 110 further comprises duty cycle control module 116 arranged to control the provision of the current to the selected lighting element array. In particular for the illustrated example, the duty cycle control module 116 is arranged to cause the array selection module 118 to sequentially select the lighting element arrays 120, 130, 140, and thus to sequentially connect the lighting element arrays 120, 130, 140 to the common current source 114, on a time-sharing basis.

Figure 2:
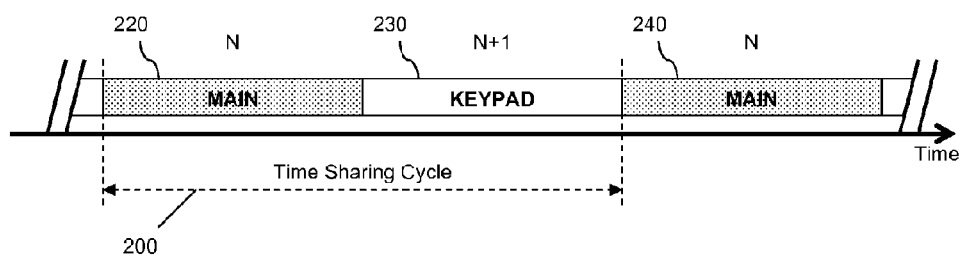
FIG. 2 illustrates an example of a time-sharing cycle such as may be implemented by controller system of FIG. 1.

FIG. 2 illustrates an example of a time-sharing cycle 200 such as may be implemented by controller system 110 for the sequential connection of lighting arrays 120, 130, 140 to the common current source 114 of FIG. 1. Each time-sharing cycle 200, is divided into two time slots 220, 230 for example one associated with the lighting array 120 for the main display and one associated with the lighting array 140 for the keypad of FIG. 1. Also illustrated generally at 240 is a first time slot of a subsequent time sharing cycle. For the illustrated example, the time-sharing cycle 200 is divided into two equally sized time slots. However, in other examples, the time-sharing cycle 200 may alternatively be divided into time slots of varying duration. Furthermore, for the illustrated example the time-sharing cycle 200 is divided into a number of time slots equal to the number of lighting arrays to be illuminated, namely two in this example, one for driving the lighting array 120 for the main display and one for driving the lighting array 140 for the keypad. In other examples, the number of time slots within the time-sharing cycle 200 need not be equal to the number of lighting arrays to be illuminated, and may be divided into more or less time slots. For example, the time-sharing cycle 200 may be divided into three time slots, and a first lighting array may be driven using two time slots, whilst a second lighting array may be driven using a single time slot. For example, the lighting array 140 for the keypad may be driven by way of a single time slot, whilst the lighting array 120 for the main display may be driven by way of a two time slots during each time-sharing cycle. It is further contemplated that one or more lighting arrays may be driven in non-consecutive time sharing cycles, for example may be driven every other time-sharing cycle.

In order to avoid perceived flickering, the repetition rate of the cycle of time-sharing is arranged to be greater than the rate at which flicker is perceived by the human eye, for example of the order of 50 Hz. In addition, the repetition rate of the cycle is arranged to be at a particular rate due to intermodulation effects with screen repetition rate, as the backlighting repetition rate has to be greater than the sum of the screen repetition rate plus the rate of flickering that can be determined by the human eye. In accordance with some examples, the repetition rate of the cycle of time-sharing may be greater than 50 Hz+200 Hz, for example in the region of 256 Hz.

In accordance with some examples, the voltage appearing at the connection between the selected lighting array 120, 130, 140 and the array selection module 118 is controlled by the voltage control module 112 independently of the connection of the lighting arrays 120, 130, 140 to the common current source 114, with the voltage control module 112 pulsing the current supplied through the inductor 160 and diode 170 to the capacitor 180 at a repetition rate much higher than that of the time-sharing cycle 200 (for example 2 MHz). The voltage across the capacitor 180 is equal to the sum of the voltage regulated at the connection between the selected lighting array 120, 130, 140 and the array selection module 118 (feedback voltage) plus the voltage across the selected lighting array. For example, this equates to the feedback voltage plus a Number of LEDs in series for the selected array X LED threshold voltage. By applying pulse width modulation to the inductor current, the boost converter 112 is able to assert the desired average voltage at the connection between the selected lighting array 120, 130, 140 and the array selection module 118, such that LED array current is accurate.

In accordance with some examples, the current source 114 may be arranged to vary the current through the selected lighting arrays 120, 130, 140. For example, the current source 114 may comprise a programmable current source arranged to provide current ranging from 0A up to, say, 21 mA, in 3 mA steps configurable by way of a 3-bit control signal. In addition, the 'on'-time, or duty cycle, of the current during the time slot allocated to the selected lighting array may be regulated by the duty cycle control module 116. In this manner, the average current throughout each time slot for the respective lighting array 120, 130, 140 may be controlled and regulated using two different approaches.

Figure 3:
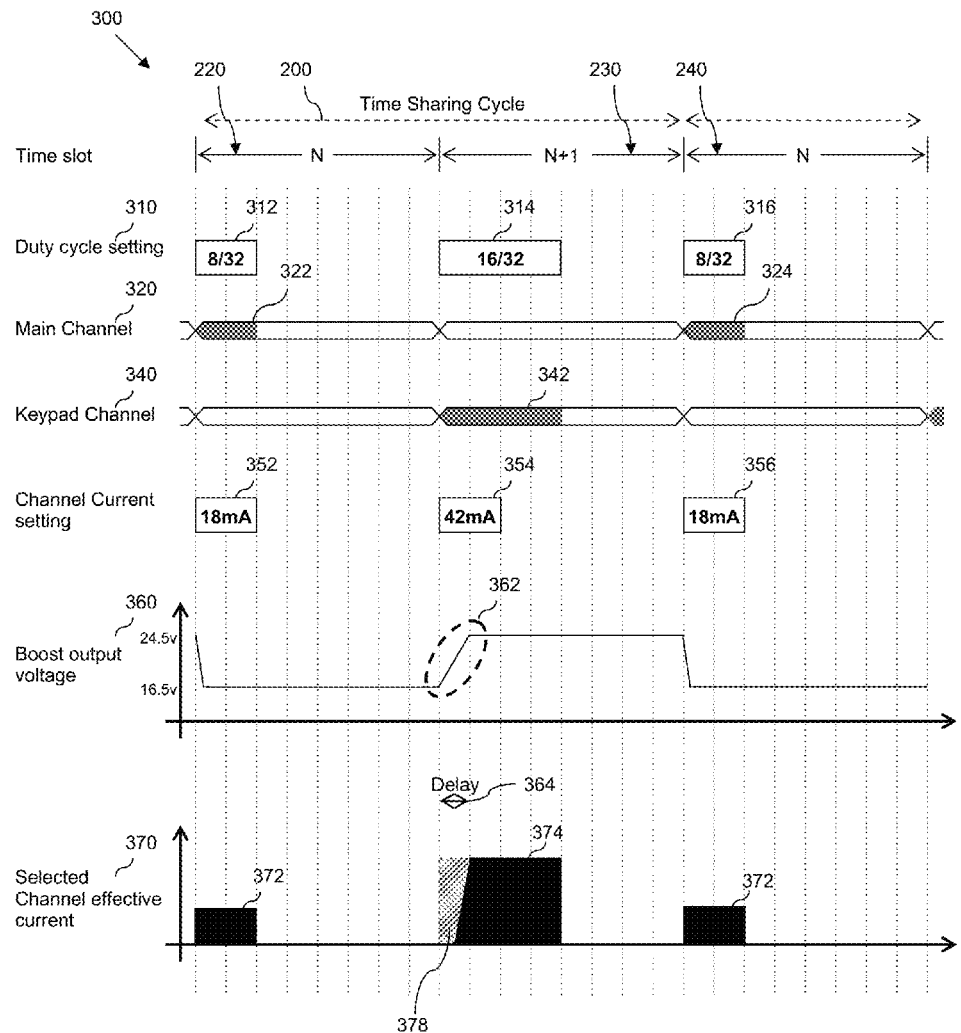
FIGS. 3 to 5 illustrate examples of timing diagrams for the time-sharing cycle of FIG. 2.

Referring now to FIG. 3, there is illustrated an example of a timing diagram 300 for the time-sharing cycle 200. Once again, for the illustrated example, the time-sharing cycle 200 comprises two substantially equal time slots 220, 230. Each time slot 220, 230 is divided into equal sized time intervals, and more particularly for the illustrated example, each time slot 220, 230 is divided into thirty two time intervals. Also illustrated generally at 240 is a first time slot of the subsequent time sharing cycle, the first time slot 240 also being divided into thirty two time intervals. The duty cycle control module 116 of FIG. 1 is arranged to configure a duty cycle setting, illustrated generally at 310, for each time slot 220, 230, 240 within each time-sharing cycle 200. The duty cycle setting 310 for each time slot 220, 230, 240 defines the 'on'-time, or duty cycle, of the current supplied to the corresponding lighting array 120, 130, 140 by the current source 114 during the respective time slot 220, 230, 240. Thus, for the illustrated example, the duty cycle setting 310 defines a number of time intervals within the respective time slot for which current is supplied to the corresponding lighting array. More specifically for the example illustrated in FIG. 3, a first duty cycle setting 312 of 8/32 is configured for the first time slot 220, a second duty cycle setting 314 of 16/32 is configured for the second time slot 230, and a third duty cycle setting 316 of 8/32 is configured for the third time slot 240.

For the example illustrated in FIG. 3, the controller system 110 is arranged to cause two of the lighting arrays to be illuminated, namely the main lighting array 120 and the keypad lighting array 140. Thus the current supplied to each of the required lighting arrays, namely for the illustrated example lighting arrays 120 and 140 of FIG. 1, is illustrated in FIG. 3 in terms of a main current channel 320 comprising the main lighting array 120, and a keypad current channel 340 comprising the keypad lighting array 140. The first time slot 220 of the time-sharing cycle 200 is associated with the main lighting array 120. Accordingly, with reference to the example of FIG. 1, the duty cycle control module 116 causes the array selection module 118 to connect the current source 114 to the main lighting array 120 during the first time slot 220 of the time-sharing cycle 200 in accordance with the first duty cycle setting 312. Thus, for the illustrated example, current has to be applied to the main channel 320 for a duration of eight of the thirty two time intervals, as illustrated at 322. The second time slot 230 of the time-sharing cycle 200 is associated with the keypad lighting array 140. Accordingly, the duty cycle control module 116 causes the array selection module 118 to connect the current source 114 to the keypad lighting array 140 during the second time slot 230 of the time-sharing cycle 200 in accordance with the second duty cycle setting 314. Thus, current has to be applied to the keypad channel 340 for a duration of sixteen of the thirty two time intervals, as illustrated at 342. The third time slot 240, being the first time slot of the next time-sharing cycle, is associated with the main lighting array 120. Accordingly, the duty cycle control module 116 causes the array selection module 118 to connect the current source 114 to the main lighting array 120 during the third time slot 240 in accordance with the third duty cycle setting 316. Thus, current has to be applied again to the main channel 320 for a duration of eight of the thirty two time intervals, as illustrated at 324.

In order to achieve a desired luminance for a specific lighting array, a specific average current is required to be supplied to that lighting array over the time sharing cycle 200. Since the time slot allocated for a given lighting array represents a ratio of the time sharing cycle 200, the required average current on the lighting array over the dedicated time slot has to be multiplied by this same ratio in order to provide the equivalent luminance of only one lighting array working without time sharing. For example, in the case where the lighting array 120 for the main display requires an average current of, say, 9 mA to achieve the desired luminance, the required average current for the corresponding time slot should be equal to the required average current for the time-sharing cycle 200 divided by the proportion of the time-sharing cycle occupied by the corresponding time slot. Thus, for the illustrated example, the time slot 220 for the main channel 320 occupies one half of the time-sharing cycle 200. Thus, the required average current for the time slot 220 is equal to the required average current for the time-sharing cycle 200 (9 mA) divided by one half. Thus, the required average current for the time slot 220 equals 18 mA.

For the example illustrated in FIG. 3, the required average current for each time slot 220, 230, 240, as determined based on the requirements for each corresponding lighting array 120, 140 of FIG. 1, is configured as a channel current setting, and is respectively illustrated at 352, 354, 356. For each time slot 220, 230, 240, the duty cycle control module 116 is then able to instruct the current source 114 to provide a sufficient current such that the current applied to the appropriate current channel 320, 340 during the current on-time for that channel, as defined by the duty cycle setting 312, 314, 316, is sufficient to provide the required average current according to the respective channel current setting 352, 354, 356.

For example, as illustrated in FIG. 3, a required average current for the time slot 220 of the first (main) channel 320 equals 18 mA. Since the current is only supplied during eight of the thirty two time intervals of the time slot 220, the average current during the time sharing cycle 200 will be equal to (9*8/32) mA which equates to 2.25 mA.

Thus, in one example the current source is programmable is to allow more granularity on the average current on the lighting array, so that the average current is equal to:

Average current=$N/32$*current source setting*$M$ (only if time sharing is activated)

Where N is the lighting PWM programmability,

In one example, the Current source setting may be considered as the DC programmability (from 0 to 42 mA by steps of 6 mA);

M is the factor when time sharing is used (½ when 2 lighting arrays in 1 time sharing cycle)

Thus, using the aforementioned equation, the maximum average current on a lighting array can be 21 mA, when 32/32 is programmed.

During the first and third time slots 220, 240, the voltage control module 112 applies a voltage on top of the lighting arrays sufficient to maintain the desired voltage at the connection between the lighting array and the array selection module 118, thus ensuring a sufficient voltage to drive the selected lighting array, namely the main lighting array 120. For example, a voltage of, say, 4 v may be required to be provided across each LED within a lighting array. Accordingly, for the example illustrated in FIG. 1, the main lighting array 120 comprises four LEDs connected in series, and thus the LED array requires a voltage of 16 v (4×4 v) to be applied across them. In order to guarantee the current source 114 to operate, an additional voltage of 0.5V, in this example, is needed. Thus, 16.5V needs to be applied by the voltage control module 112 on the top of the lighting arrays. The duty cycle control module 116 instructs the array selection module 118 to operably couple the main lighting array 120 to the current source 114 for eight of the thirty two time intervals within each of the first and third time slots 220, 240. In this manner, an instantaneous current of 18 mA is supplied to the main current channel 320 during each of the first and third time slots 220, 240 during the duty cycle setting 312 and 316 of FIG. 3, and thus an average current of (8/32*18*1/2) mA, which equates to 2.25 mA, is supplied to the main current channel 320.

For the second (keypad) current channel 340 of FIG. 3, for example, a current source setting of 42 mA is configured, and to be provided over sixteen of the thirty two time intervals for the corresponding time slot 230. Thus, the average current of (16/32*42*1/2) mA, which equates to 10.5 mA, is supplied to the keypad current channel 340.

During the second time slot 230, the voltage control module 112 to applies a voltage on top of the lighting arrays sufficient to maintain the desired voltage at the connection between the lighting array and the array selection module 118, thus ensuring a sufficient voltage to drive the selected lighting array, namely the keypad lighting array 140. Accordingly, for the example illustrated in FIG. 1, the keypad lighting array comprises six LEDs connected in series, and thus may require a voltage of 24 v (6×4 v) to be applied across them. In order to guarantee the current source 114 to operate, an additional voltage of 0.5V, in this example, is needed. Thus, 24.5V is applied by the voltage control module 112 on the top of the lighting arrays.

Illustrated in plot 370 of FIG. 3 are examples of the effective currents 372, 374 for each of the current channels 320, 340. The effective currents 372, 374 for the current channels 320, 340 are those currents provided to the respective lighting arrays during the configured time intervals of their respective time slots, as described above. The required effective currents 372, 374 for the respective current channels 320, 340 are respectively 2.25 mA and 10.5 mA. For the effective current 372 of main current channel 320, since the voltage to be applied by the voltage control module 112 during the respective time slots 220, 240 is less than (or equal to) that required for the preceding time slot, the required current is achieved substantially immediately, due to the available charge present in the capacitor 180. However, for the keypad current channel 340 the voltage control module 112 is required to apply a significantly higher voltage across the selected lighting array. As a result, there is a delay, illustrated at 364, in the effective current 374 for the keypad current channel 340 reaching its required value, due to a rise time for the voltage control module 112 to increase the voltage across the selected lighting array, illustrated at 362. As a result, the effective current 374 provided to the keypad current channel 340 will be less than that required to achieve the desired luminance for the keypad lighting array 140, by an amount generally equal to the hatched area indicated at 378. This plot is shown to better highlight specific effects, and is thus not drawn to scale. The delay 362 is completely dependent upon rise time performance of the voltage control module 112, as well as of the voltage difference between the used lighting arrays (e.g. 24.5V–16.5V).

According to further examples, the duty cycle control module 116 of FIG. 1 is arranged to cause the current provided to the lighting element arrays 120, 130, 140 to be compensated for any rise time associated with the voltage applied thereto. For example, referring to FIG. 4, there is illustrated an example of a timing diagram 400 for the time-sharing cycle 200 wherein a current applied to a lighting element array is compensated for a rise time associate with the voltage applied thereto. In the same manner as for FIG. 3, the time-sharing cycle 200 of FIG. 4 comprises two substantially equal time slots 220, 230, with each time slot 220, 230 being divided into thirty two time intervals. Also illustrated generally at 240 is a first time slot of the subsequent time sharing cycle, the first time slot 240 also being divided into thirty two time intervals. Duty cycle settings, once again illustrated generally at 310 for each time slot 220, 230, 240, are configured by the duty cycle control module 116 of FIG. 1, and which define the duty cycle ('on'-time) of the current supplied to the corresponding lighting array 120, 130, 140 by the current source 114 during the respective time slot 220, 230, 240. Once again for the illustrated example, a first duty cycle setting 312 of 8/32 is configured for the first time slot 220, a second duty cycle setting 314 of 16/32 is configured for the second time slot 230, and assuming no duty cycle setting change for the time slot 220, the duty cycle setting 316 will be maintained at 8/32 for the third time slot 240. Thus, time slot 240 is the first time slot of the next time-sharing cycle. The time-sharing cycle may be repeated ad infinitum unless a duty cycle setting is re-programmed. Without any change in the programming information, the controller has to perform the set up operation only once to enable the backlighting system 100 to work autonomously Accordingly, current is applied to the main channel 320 for a duration of eight of the thirty two time intervals for each of the first time slot 220 and the third time slot 240, as illustrated at 322 and 324 respectively, and to the keypad channel 340 for a duration of sixteen of the thirty two time intervals, as illustrated at 342.

Figure 4:
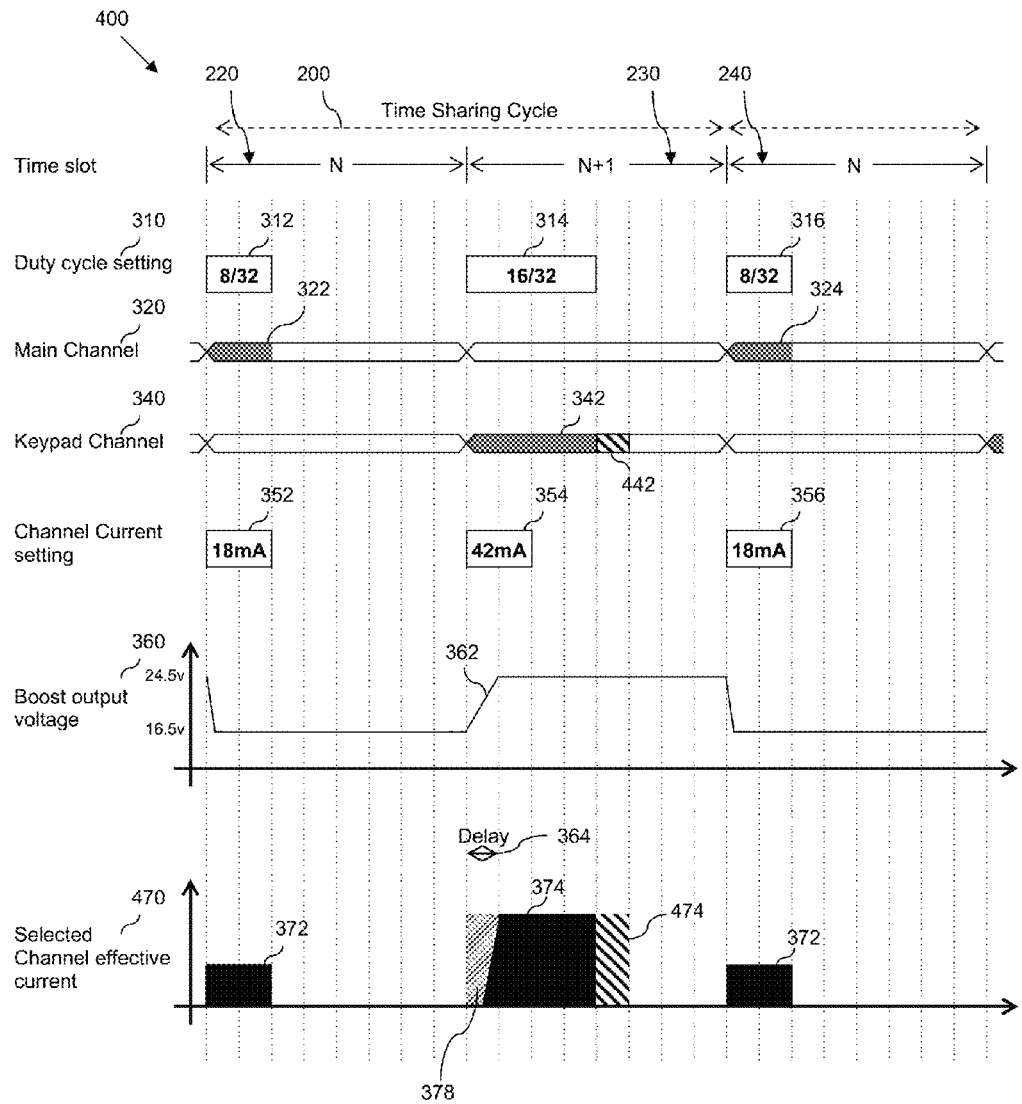

For the example illustrated in FIG. 4, the controller system 110 is again arranged to cause two of the lighting arrays to be illuminated, namely the main lighting array 120 and the keypad lighting array 140. Accordingly, the average required current for each time slot 220, 230, 240, as determined based on the requirements for each of the corresponding lighting arrays 120, 140, is configured as channel current settings, and is illustrated at 352, 354, 356. A required maximum average current for the main channel 320 equals 9 mA, which is to be provided during eight of the thirty two time intervals for each of the time slots 220, 240 so the average current for the main channel is equal to (8/32*18*1/2) mA, which equates to 2.25 mA. Furthermore, during the first time slot 220 and the third time slot 240, the voltage control module 112 applies a voltage on top of the lighting arrays that is sufficient to maintain the desired voltage at the connection between the lighting array and the array selection module 118, thereby ensuring a sufficient voltage to drive the selected lighting array, for example a voltage of 16.5 v (4×4 v+0.5 v) for the main lighting array 120. A required maximum average current for the keypad channel 340 equals 42 mA, which is to be provided during sixteen of the thirty two time intervals for the second time slot 230, so the average current for the keypad channel is equal to (16/32*42*1/2) mA, which equates to 10.5 mA. Accordingly, during the second time slot 230, the voltage control module 112 applies a voltage on top of the lighting arrays that is sufficient to maintain the desired voltage at the connection between the lighting array and the array selection module 118, thus ensuring a sufficient voltage to drive the keypad lighting array 140, for example a voltage of 24.5 v (6×4 v+0.5 v). The voltage across the lighting element arrays 120, 140 is illustrated by plot 360.

As previously mentioned, for the example illustrated in FIG. 4, the duty cycle control module 116 is arranged to cause the current provided to the lighting element arrays 120, 130, 140 to be compensated for a rise time of the voltage applied thereto. In particular for the example illustrated in FIG. 4, the duty cycle control module 116 is arranged to cause the current duty cycle ('on'-time) for a current channel of a lighting array requiring compensation to be extended. For example, the duty cycle control module 116 may be arranged to cause the array selection module 118 to connect the selected lighting array to the common current source 114 for an extended period of time. Thus, for the illustrated example, since there is a delay 364 in the effective current 374 for the keypad current channel 340 reaching its required value, due to a rise time for the voltage applied by voltage control module 112, the duty cycle control module 116 causes the duty cycle for the keypad current channel 340 to be extended, as illustrated at 442. As a result, current is provided to the keypad current channel 340 for a longer period of time during the time slot 230. Therefore, the effective current 374 provided to the keypad current channel 340 is extended by an amount proportional to the extension 442 to the duty cycle, as illustrated at 474 of plot 470. For example, the duty cycle control module 116 may be arranged to cause the duty cycle to be extended by an amount substantially equal to the delay 364 resulting from the rise time 362. Accordingly, by appropriately configuring the amount by which the duty cycle is extended, the duration of the keypad current channel 340 is increased to compensate for the absence of current, illustrated at 378, caused by the rise time 362 for the voltage control module 112 to increase the voltage on top of the selected lighting array. In this manner, the effective current 374 provided to the keypad current channel 340 is compensated sufficiently to provide the required current to achieve a desired luminance for the keypad lighting array 140. Thus, the controller system 110 is able to provide an accurate independent luminosity with respect to the PWM duty cycle setting, and obtain an accurate current linearity for an reliable dimming functionality.

Referring back to FIG. 1, and in accordance with some examples of the present invention, the controller system 110 further comprises a current meter module 115, which for the illustrated example is located between the array selector module 118 and the current source 114. The current meter module 115 is arranged to detect the current flowing through the selected lighting element array(s), so long as this current is provided to the lighting array in order to provide an indication of the detected current to the duty cycle control module 116. In this manner, the duty cycle control module 116 is able to detect from the current measurement performed by the current meter module 115 whether there has been a delay in the effective current for any time slot, and if such a delay is detected, to determine the length of such a delay. Accordingly, the duty cycle control module 116 is subsequently able to cause the current provided within corresponding time slots of subsequent time sharing cycles to be compensated based on the received indication of the detected current, and in particular is able to dynamically configure the amount of compensation taking into account the determined length of such a delay.

Figure 5:
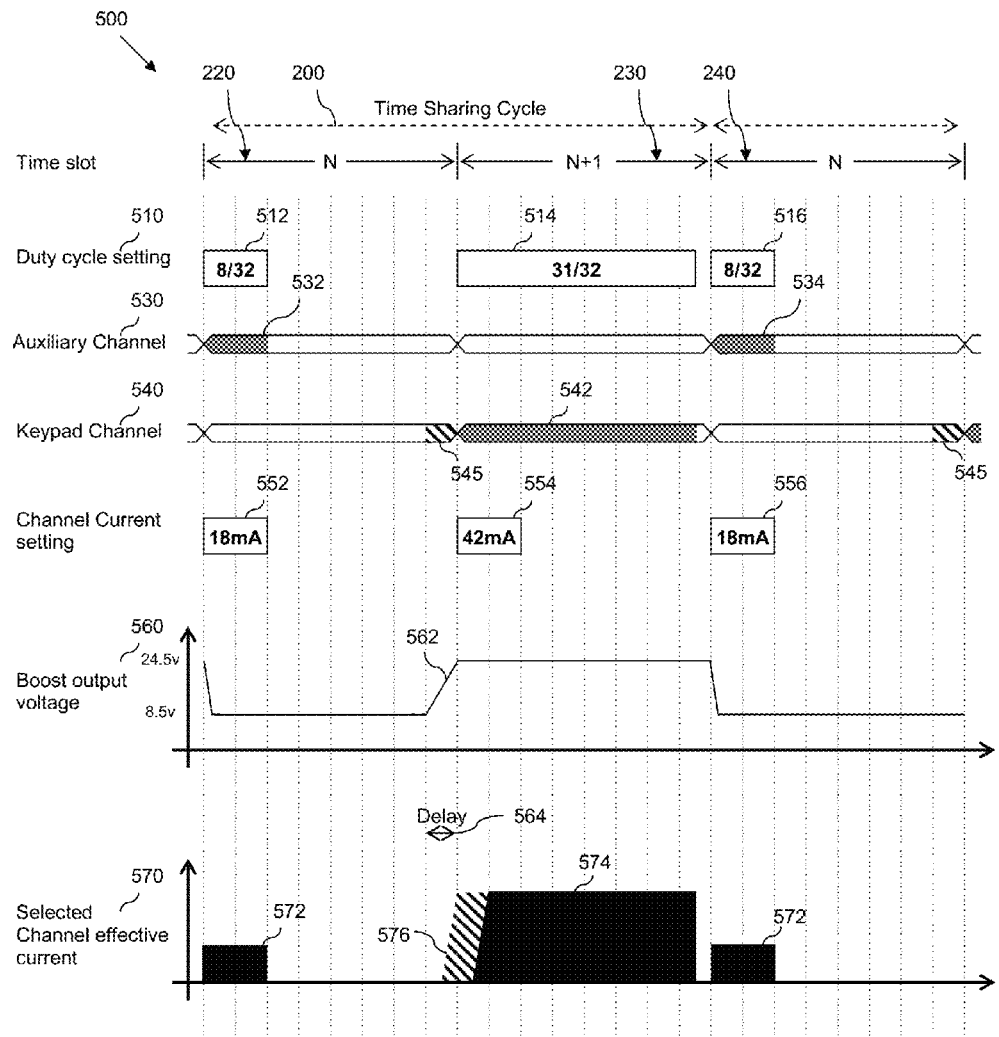

Referring now to FIG. 5, there is illustrated an example of a timing diagram 500 for the time-sharing cycle 200 wherein a current applied to a lighting element array is compensated for a rise time of the voltage applied thereto, in accordance with an alternative example. In the same manner as for FIG. 3 and FIG. 4, the time-sharing cycle 200 of FIG. 5 comprises two substantially equal time slots 220, 230, with each time slot 220, 230 being divided into thirty two time intervals. Also illustrated generally at 240 is a first time slot of the subsequent time sharing cycle, the first time slot 240 also being divided into thirty two time intervals. Duty cycle settings, illustrated generally at 510, for each time slot 220, 230, 240 are configured by, say, the duty cycle control module 116 of FIG. 1, and which define the duty cycle (on-time) of the current supplied to the corresponding lighting array by the current source 114 during the respective time slot 220, 230, 240. For the example illustrated in FIG. 5, a first duty cycle setting 512 of 8/32 is configured for the first time slot 220, a second duty cycle setting 514 of 31/32 is configured for the second time slot 230, and a third duty cycle setting 516 of 8/32 is configured for the third time slot 240.

For the example illustrated in FIG. 5, the controller system 110 is arranged to operate in an alternative mode to that for FIGS. 3 and 4, whereby the controller system 110 is arranged to cause the auxiliary lighting array 130 and the keypad lighting array 140 to be illuminated. Accordingly, current is applied to an auxiliary current channel 530 comprising the auxiliary lighting array 130 for a duration of eight of the thirty two time intervals within each of the first and third time slots 220, 240, as illustrated at 532 and 534 respectively, and to the keypad current channel 540 for a duration of thirty one of the thirty two time intervals, as illustrated at 542.

The average required current for each time slot 220, 230, 240, as determined based on the requirements for each corresponding lighting array 130, 140, is configured as a channel current setting, and is illustrated respectively at 552, 554, 556. A required maximum average current for the auxiliary channel 530 equals 9 mA, which is to be provided during eight of the thirty two time intervals for each of the first time slot 220 and third time slot 240, so the average current for the auxiliary channel is equal to (8/32*18*1/2) mA, which equates to 2.25 mA. Furthermore, during the first time slot 220 and the third time slot 240, the voltage control module 112 applies a voltage on top of the lighting arrays that is sufficient to maintain the desired voltage at the connection between the lighting array and the array selection module 118, thus ensuring a sufficient voltage across the current source to drive accurately the selected lighting array, for example a voltage of 8.5 v (2×4 v+0.5 v) for the auxiliary lighting array 130. A required maximum average current for the keypad channel 540 equals 21 mA, which is to be provided during thirty one of the thirty two time intervals for the second time slot 230, so the average current for the keypad channel is equal to (31/32*42*1/2) mA, which equates to 20.34 mA. Accordingly, during the second time slot 230, the voltage control module 112 applies a voltage on top of the lighting arrays that is sufficient to maintain the desired voltage at the connection between the lighting array and the array selection module 118, thus ensuring a sufficient voltage across the current source to drive the keypad lighting array 140. The voltage across the lighting element arrays is illustrated by plot 560.

For the effective currents 572 of current channels 530, since the voltage to be applied by the voltage control module 112 during their respective time slots is less than (or equal to) that required for the preceding time slot, the required current is achieved substantially immediately. However, for the keypad current channel 540, the voltage control module 112 is required to apply a significantly higher voltage across the selected lighting array 140. As a result, there is a delay, illustrated at 564, in the effective current 574 of plot 570 for the keypad current channel 540 reaching its required value, due to a rise time for the voltage control module 112 to increase the voltage across the selected lighting array.

The duty cycle control module 116 of FIG. 1 is arranged to cause the current provided to the lighting element arrays 120, 130, 140 to be compensated for a rise time of the voltage applied thereto. Accordingly, for the illustrated example, compensation is required for the current provided to the keypad current channel 540 within the second time slot 230. However, for the example illustrated in FIG. 5, the duty cycle for the second time slot 230 is configured such that the keypad current channel 540 comprises a current 'on'-time of thirty one out of the thirty two time intervals for time slot 230. Since the delay caused by the rise time is greater than a period equal to one time interval, the unused time intervals (which for this example comprise a single time interval) are insufficient for enabling the duty cycle to be extended to compensate for the delay without such an extension intruding into the following time slot (namely the third time slot 240).

Accordingly, for the example illustrated in FIG. 5, the duty cycle control module 116 of FIG. 1 is arranged to cause current from the common current source 114 to be provided to a lighting element array that requires compensation prior to the start of the time slot within the time-sharing cycle 200 associated with that lighting element array. For example, the duty cycle control module 116 may be arranged to cause the array selection module 118 to connect a lighting array that requires compensation to the common current source 114 prior to the start of its associated time slot. Thus, for the example illustrated in FIG. 5, since the keypad current channel 540 requires current compensation, the duty cycle control module 116 causes current to be provided to that current channel 540 prior to the start of its associated time slot 230, as illustrated by an extension of the duty cycle at 545. It is unlikely that the preceding current channel, namely the auxiliary current channel 530 for the illustrated example, needs compensating as time slot 220 has no rise time. Therefore, current can be provided to the keypad current channel 540 in order to compensate for the voltage rise time without interfering with the current supply for another current channel.

In addition, since the voltage control module 112 of FIG. 1 is arranged to maintain the voltage appearing at the connection between the selected lighting array and the array selection module 118 at a desired value, the voltage control module 112 will automatically react to provide the required voltage across the lighting arrays upon current from the common current source 114 being provided to a lighting element array that requires compensation prior to the start of the respective time slot. Accordingly, and as illustrated by the output voltage plot 560, the rise time 562 for the voltage across the keypad lighting array 240 occurs prior to the start of the second time slot 230. Accordingly the delay 564 in the effective current for the keypad current channel 540 occurs prior to the start of the respective time slot 230. As a result, the effective current for the keypad current channel 540 is exactly equal to the programmed average current as illustrated at 576 of plot 570.

Thus, the effective current 574 provided to the keypad current channel 540 is compensated for, as illustrated generally at 576, prior to the start of the respective time slot 230. Accordingly, by appropriately configuring by how much time current is provided to the current channel that requires compensation prior to the start of its associated time slot, the current provide to that current channel may be accurately compensated in order to account for the rise time for the voltage control module 112 to increase the voltage across the respective lighting array. In this manner, the effective current provided to that current channel may be compensated sufficiently to provide the required current to achieve a desired luminance for the respective lighting array. Thus, the controller system 110 is able to provide independent luminosity and dimming functionality with accurate current linearity, even when the unused time intervals for the associated time slot are insufficient for enabling the duty cycle to be extended to compensate for the delay without such an extension intruding into the following time slot, and thereby interfering with the current supply to the current channel associated with that following time slot.

In a further example, a cycle extension may be performed prior to initiating the cycle in the same manner as described with regard to FIG. 5. In this further example, let us assume that the duty cycle of the previous time slot is so long that it affects the rise time. In this case, the voltage control module may not provide sufficient voltage before the cycle starts. Hence, re-compensation needs to be effected in the next time sharing cycle.

In a further example, following a duty cycle extension performed prior to initiating the cycle (in the same manner as for FIG. 5), a channel may be re-programmed to a new duty cycle setting or current setting. Alternatively, in one example, the current may be compensated in an alternative manner, for example by reducing the prior start delay by removing the prior start and changing the amount of time extension.

Figure 6:
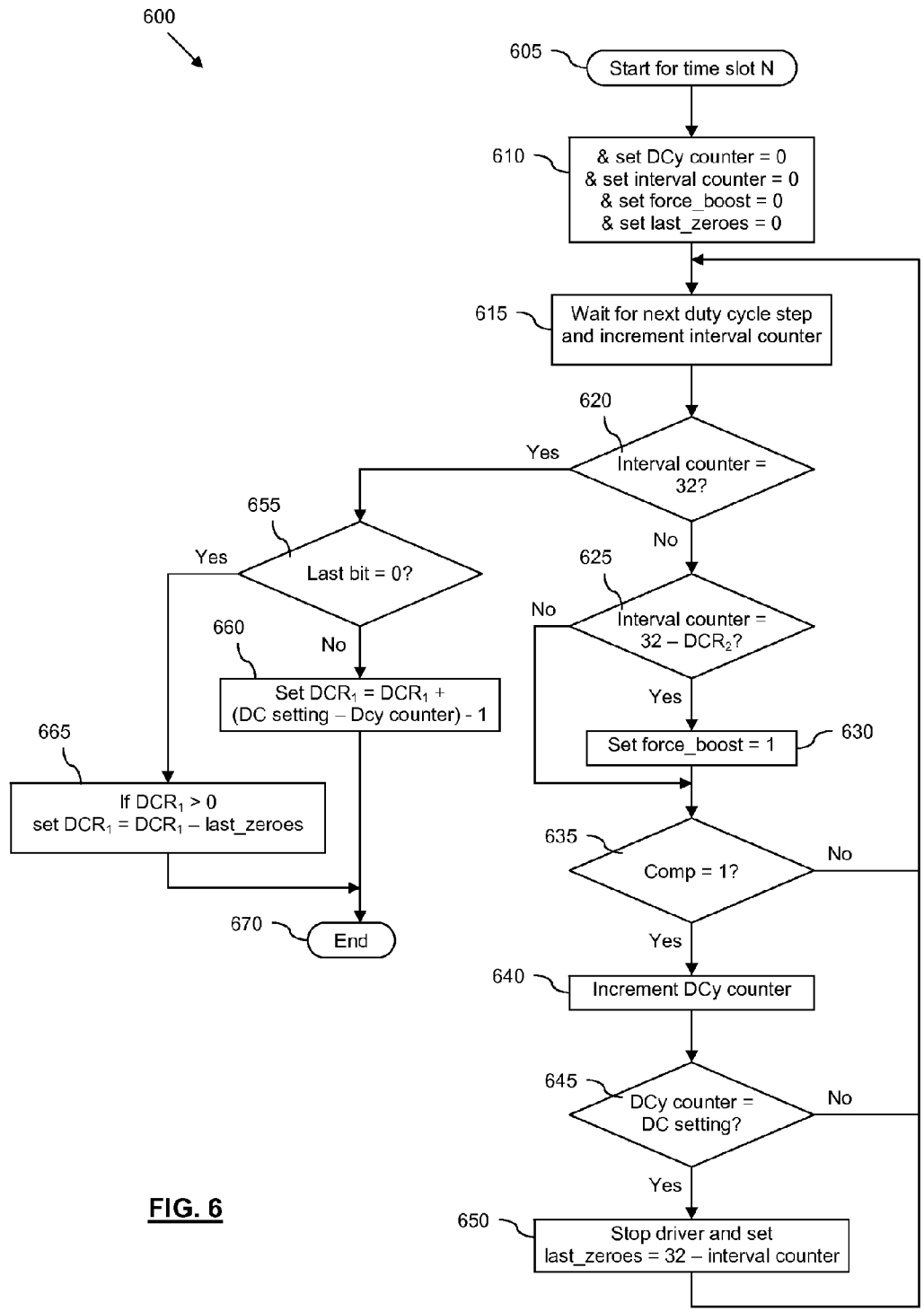
FIG. 6 illustrates an example of a simplified flowchart of a method for controlling a plurality of lighting element arrays.

Referring now to FIG. 6 there is illustrated an example of a simplified flowchart of a method for controlling a plurality of lighting element arrays. The method of FIG. 6 may, for example, be implemented by a controller system, such as the controller system 110 of FIG. 1. The method starts at step 605 with the start of a time slot N within a time-sharing cycle. Next, in step 610, a duty cycle counter variable (DCy), interval counter variable, force boost variable and a duty cycle report error variable (last_zeroes) are each initialised by being set equal to zero. The method then moves on to step 615, where it waits for the next duty cycle step, and the interval counter is incremented before moving on to step 620. For the illustrated example, it is determined in step 620 whether the interval counter variable comprises a value equal to '32', indicating that the end of the time slot N has been reached. In this flowchart example, the duty cycle resolution is set to '32' equal intervals. However, in other examples, the duty cycle resolution may be set to other values (e.g. '64' for a higher duty cycle step resolution). For digital implementation simplification, the number of duty cycle steps in a time slot is chosen as power of '2' to be able to use synchronous binary counters.

If the interval counter variable comprises a value not equal to 32, indicating that the end of the time slot N has not been reached, the method moves on to step 625. In step 625, it is determined whether the interval counter variable comprises a value equal to, for the illustrated example, [32−$DCR_2$], where $DCR_2$ comprises a duty cycle report for the next time slot (N+1). If the interval counter variable does comprise a value equal to [32−$DCR_2$], the method moves to step 630 where the force boost variable is set to 1, thereby causing the voltage control module to start in order to obtain the current channel associated with the next time slot (N+1) to be accurate at the beginning of its time slot. In this manner, a rise time of the voltage applied thereto is compensated for. The method then moves on to step 635. Referring back to step 625, if the interval counter variable does not comprise a value equal to [32−$DCR_2$], the method moves straight to step 635, which relates to the monitoring of the current meter.

In step 635, a determination is made as to whether the current is equal to the expected program current (e.g. whether the COMP variable equals '1'. If the current does not equal the expected program current in step 635, the flowchart loops back to step 615. Hence, following a first determination that current does not equal the expected program current, it is known that compensation is required. If the current does equal the expected program current in step 635, e.g. the COMP variable equals '1' the flowchart move to step 640 where the duty cycle (DCy) counter is incremented. Thus, once the determination in step 635 is 'YES', the interval counter has the required information for the duty cycle extension.

In step 645, a determination is made as to whether the duty cycle (DCy) counter has reached a duty cycle setting. In one example, the duty cycle setting may be programmed by a host controller. If the duty cycle (DCy) counter has not reached the duty cycle setting in step 645, the flowchart loops back to step 615. If the duty cycle (DCy) counter has reached the duty cycle setting in step 645, the flowchart move to step 650 where the LED driver is stopped and the last_zeroes are set to a value of '32-interval counter'.

Referring back to step 620, if the interval counter variable comprises a value equal to 32, thereby indicating that the end of the time slot N has been reached, the method moves on to step 655. In step 655, a determination is made as to whether the last bit (corresponding to the LSB (least significant bit) of the last_zeroes variable, which in turn corresponds to the absence of current at the end of a time slot) equals a zero value. If the last bit of the last_zeroes variable is equal to zero, and the duty cycle report is greater than zero, the duty cycle report is set to the previous duty cycle report minus the last_zeroes value, as shown in step 665. If the last bit of the last_zeroes variable is not equal to zero, the duty cycle report is set to the previous duty cycle report plus (the duty cycle setting minus the duty cycle counter value) minus '1', as shown in step 660. The flowchart then ends at step 670.

In effect, steps 655 to 665 manage the optimization of the force boost, for example in a case where there is a setting change (either duty cycle or current setting). It is noteworthy that these steps make the extension 545 in FIG. 5 obsolete to the changes. Based on the zeroes calculation, it is possible to determine whether the extension 545 of FIG. 5 is necessary or not. Furthermore, the zeroes calculation makes it possible to determine whether the compensation can be achieved in the considered time slot (base on power loss optimization). This dynamic operation allows the system to prevent a current boost conversion to operate whilst the previous channel is activated for no reason.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Also for example, in one embodiment, the illustrated elements of controller system 110 are circuitry located on a single integrated circuit or within a same device. Alternatively, controller system 110 may include any number of separate integrated circuits or separate devices interconnected with each other. For example, current source may be located on a same integrated circuit as duty cycle control module or on a separate integrated circuit or located within another peripheral or slave discretely separate from other elements of controller system 110. Also for example, controller system 110 or portions thereof may be soft or code representations of physical circuitry or of logical representations convertible into physical circuitry. As such, controller system 110, or parts thereof, may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A controller system for controlling a plurality of lighting element arrays, the controller system comprising:
    an array selection module that applies a voltage to a selected lighting element array;
    a voltage control module coupled to the array selection module and that applies a voltage to at least the selected lighting element array;
    an active current source provides a current to the selected lighting element array;
    duty cycle control module coupled to the array selection module and that controls a ratio of the current from the active current source to the selected lighting element array over a time sharing cycle,
        wherein the duty cycle control module further: causes the array selection module to sequentially select the lighting element arrays in accordance with a time-sharing cycle, causes the current from the active current source to be provided to the selected lighting element array in accordance with a respective duty cycle setting of the time-sharing cycle, and causes a duration of the current provided to the selected lighting element array to be extended to compensate for a rise time of the voltage applied thereto.

2. The controller system of claim 1 wherein the controller system further comprises a current meter module that detects current flowing through the selected lighting element array in a plurality of time-sharing cycles.

3. The controller system of claim 2 wherein the current meter module further provides an indication of the detected current to the duty cycle control module.

4. The controller system of claim 3 wherein the duty cycle control module further generates the current provided to the selected lighting element array within a subsequent time-sharing cycle based on the received indication of the detected current.

5. The controller system of claim 1 wherein the duty cycle control module further causes a duty cycle for a time slot corresponding to a lighting element array requiring compensation be extended.

6. The controller system of claim 5 wherein the duty cycle control module further causes the duty cycle to be extended by an amount equal to a delay associated with the rise time of the voltage applied to the selected lighting element array.

7. The controller system of claim 1 wherein the duty cycle control module further causes the array selection module to connect a lighting element array requiring compensation to the active current source for an extended period of time.

8. The controller system of claim 1 wherein the duty cycle control module further causes current from the active current source to be provided to a lighting element array requiring compensation prior to a start of a time slot within the time-sharing cycle associated with that lighting element array.

9. The controller system of claim 8 wherein the duty cycle control module further causes current from the active current source to be provided to a lighting element array requiring compensation prior to the start of a time slot within the time-sharing cycle associated with that lighting element array by an amount of time equal to a delay associated with the rise time of the voltage applied to the lighting element array.

10. The controller system of claim 8 wherein the duty cycle control module further causes the array selection module to connect a lighting element array requiring compensation to the active current source prior to the start of a time slot within the time-sharing cycle associated with that lighting element array.

11. A method for controlling a plurality of lighting element arrays, the method comprising the steps of:
    sequentially selecting, by an array selection module coupled to a voltage selection module, the lighting element arrays in accordance with a time-sharing cycle, wherein the array selection module is directed to select by a duty cycle control module
    applying, by the array selection module, a voltage to at least a selected lighting element array;
    applying, by the voltage selection module, a voltage to at least the selected lighting element array;
    controlling, by the duty cycle control module, a ratio of a current from an active current source to the selected lighting element array over the time sharing cycle;
    providing, by the active current source, a current to the selected lighting element array in accordance with a respective duty cycle setting of the time-sharing cycle, wherein the active current source is directed to provide by a duty cycle control module;
    and compensating, by the duty cycle control module, the current provided by the active current source to the selected lighting element array for a rise time of the voltage applied thereto by extending a duration of the current provided to the selected lighting element.

12. The method of claim 11 further comprising:
detecting, by a current meter module, current flowing through the selected lighting element array in a plurality of time-sharing cycles including the time-sharing cycle.

13. The method of claim 12 further comprising:
providing, by the current meter module, an indication of the detected current to a duty cycle control module.

14. The method of claim 13 further comprising:
generating, by the duty cycle control module, the current provided to the selected lighting element array within a subsequent time-sharing cycle based on the received indication of the detected current.

15. The method of claim 11 further comprising:
causing, by a duty cycle control module, a duty cycle for a time slot corresponding to a lighting element array requiring compensation be extended.

16. The method of claim 15 further comprising:
causing, by the duty cycle control module, the duty cycle to be extended by an amount equal to a delay associated with the rise time of the voltage applied to the selected lighting element array.

17. The method of claim 11 further comprising:
causing, by a duty cycle control module, the array selection module to connect a lighting element array requiring compensation to the active current source for an extended period of time.

18. The method of claim 11 further comprising:
causing, by a duty cycle control module, current from the active current source to be provided to a lighting element array requiring compensation prior to a start of a time slot within the time-sharing cycle associated with that lighting element array.

19. The method of claim 18, further comprising:
causing, by the duty cycle control module, current from the active current source to be provided to a lighting element array requiring compensation prior to the start of a time slot within the time-sharing cycle associated with that lighting element array by an amount of time equal to a delay associated with the rise time of the voltage applied to the lighting element array.

20. The method of claim 18, further comprising:

causing, by the duty cycle control module, the array selection module to connect a lighting element array requiring compensation to the active current source prior to the start of a time slot within the time-sharing cycle associated with that lighting element array.

* * * * *